Figure 1:
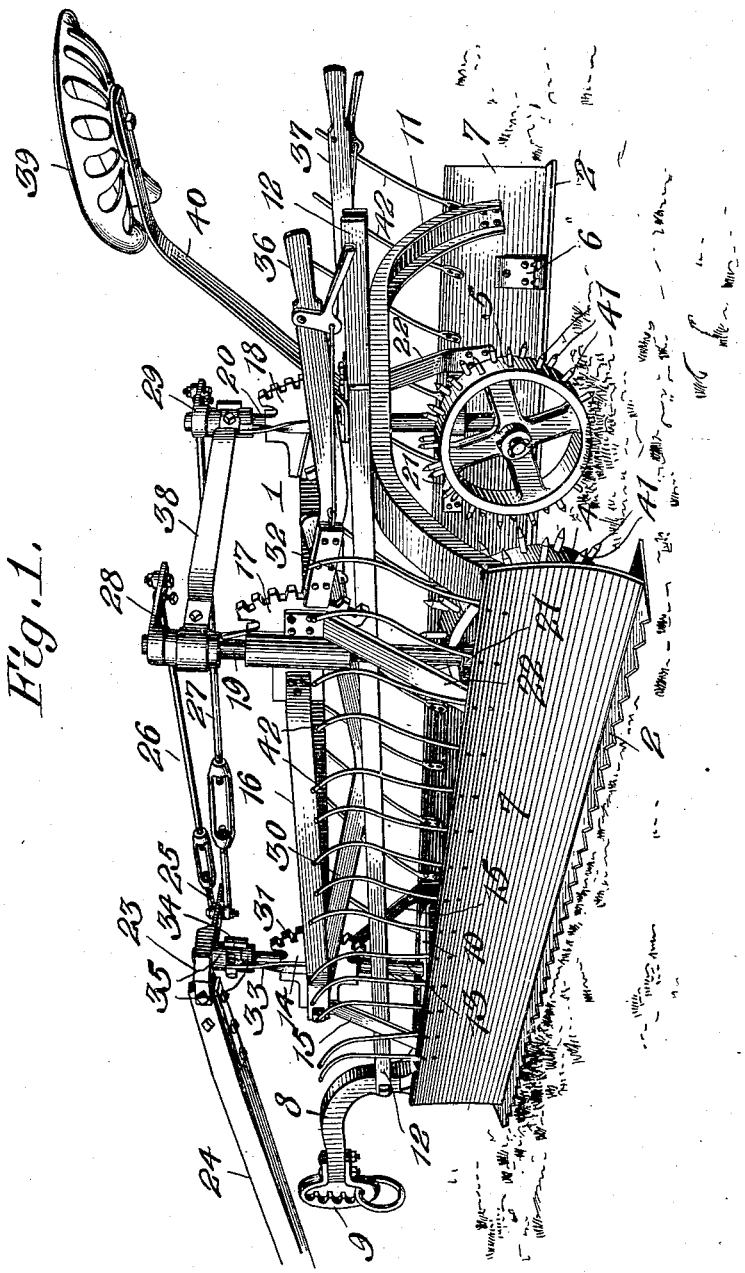

R. G. GOSE.
SAGE BRUSH CUTTER.
APPLICATION FILED JUNE 2, 1909.

969,469.

Patented Sept. 6, 1910.
3 SHEETS—SHEET 1.

Witnesses:
W. B. Ogden
S. A. Young

Inventor:
Robert G. Gose
by Watson E. Coleman
Atty.

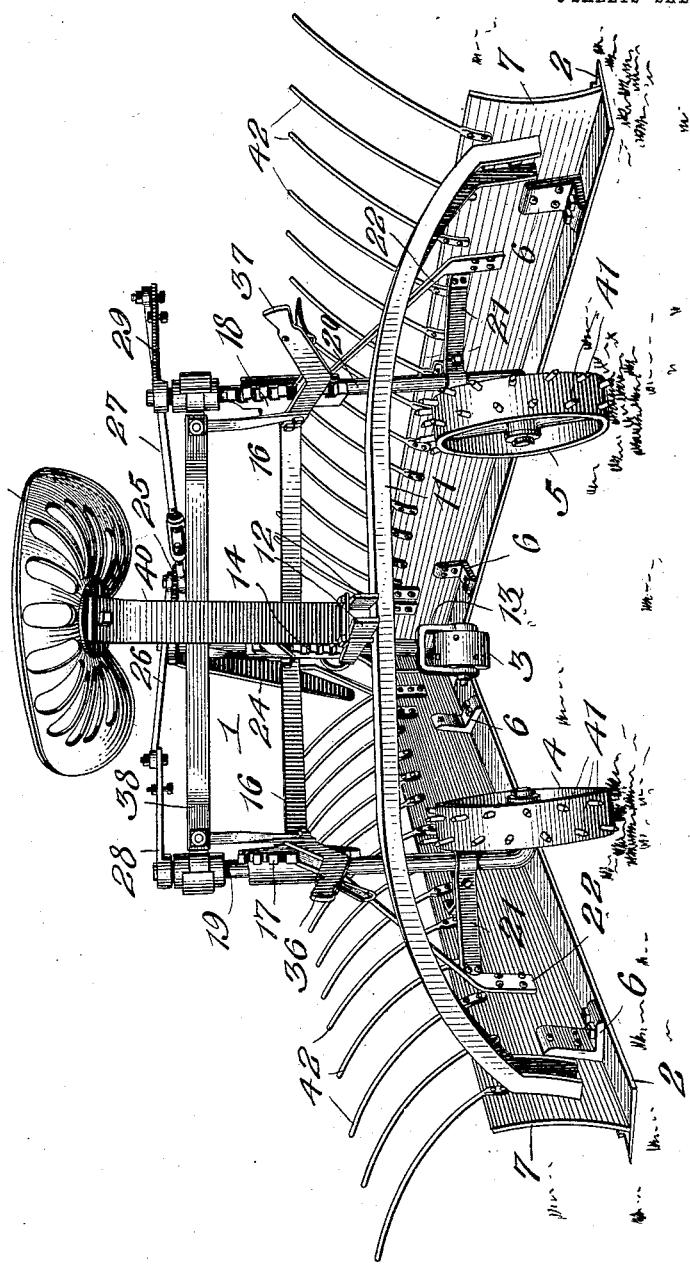

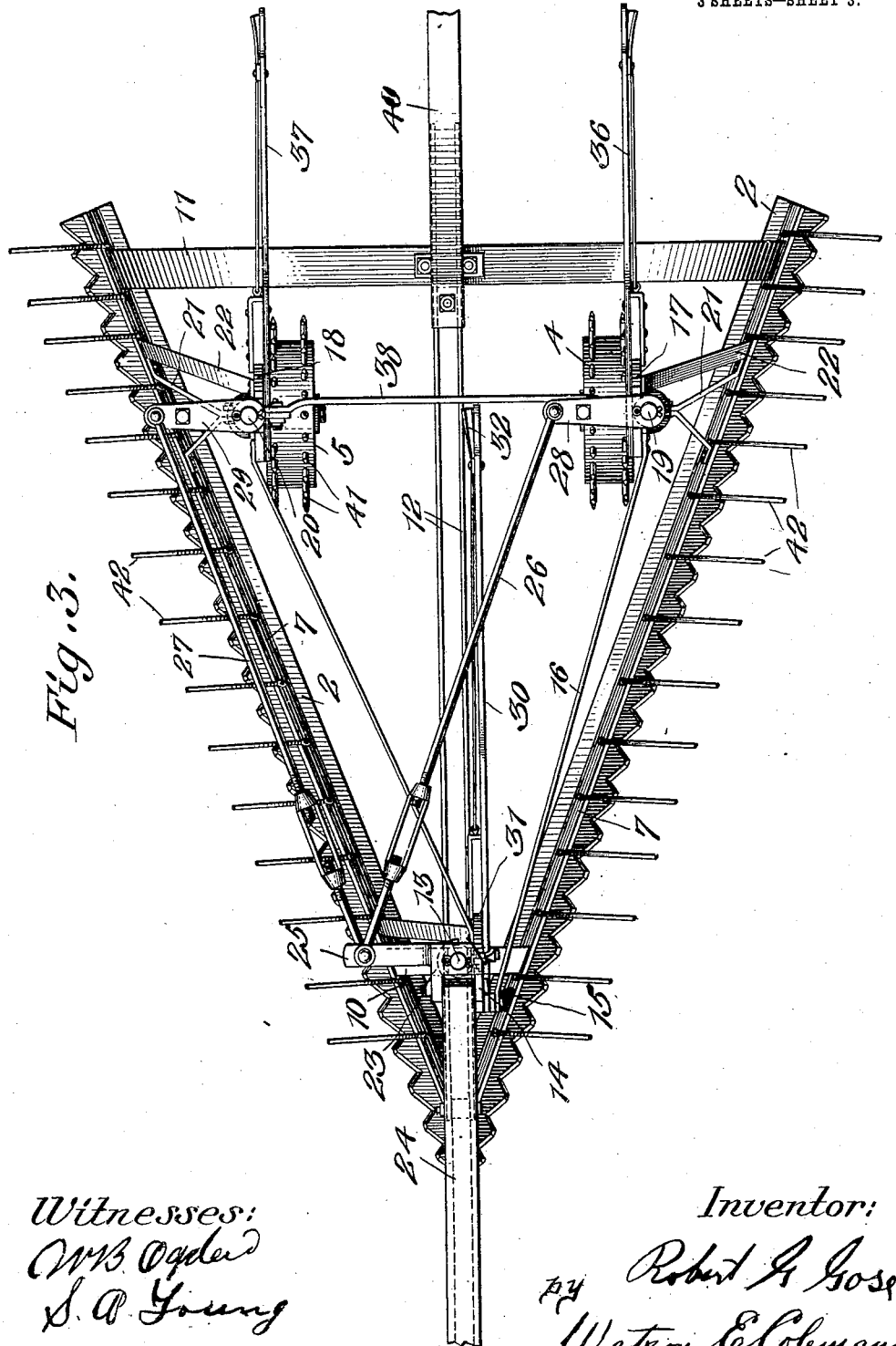

UNITED STATES PATENT OFFICE.

ROBERT G. GOSE, OF UPTON, WYOMING.

SAGE-BRUSH CUTTER.

969,469.  Specification of Letters Patent.  Patented Sept. 6, 1910.

Application filed June 2, 1909. Serial No. 499,830.

*To all whom it may concern:*

Be it known that I, ROBERT G. GOSE, a citizen of the United States, residing at Upton, county of Weston, and State of Wyoming, have invented a new and useful Sage-Brush Cutter, of which the following is a specification.

My invention relates to improvements in machines for cutting sage-brush, cactus and other shrubbery or vegetable growth so that the ground cleared by the machine may be used for agricultural purposes.

The object of the invention is to provide a simple and practical machine of this character which will be strong and durable in construction, and powerful in operation, and which has improved means for adjusting the cutting mechanism and guiding the machine.

With the above and other objects in view, the invention consists of the novel construction, combination and arrangement of parts, hereinafter fully described and claimed, and illustrated in the accompanying drawings in which:—

Figures 1 and 2 are perspective views of my improved sage-brush cutter looking toward the side and rear of the same; and Fig. 3 is a top plan view, the seat being omitted.

The invention comprises a frame 1 carrying rearwardly diverging horizontally disposed cutting blades 2 and supported by front and rear wheels 3, 4, 5. The cutter blades 2 are secured by angle plates 6 to the bottom edges of two vertically disposed rearwardly diverging mold boards 7 in the form of metal plates curved transversely, and the projecting outer edges of the blades 2 are formed with V-shaped notches and beveled to provide cutting teeth so that said cutting blades resemble sickle bars of mowing machines. The forward converging ends of the mold boards 7 are united to the lower downturned end of a forwardly extending draft beam 8 which carries the usual clevis 9 for the attachment of the draft animals. The mold boards 7 are further united by front and rear cross members 10, 11, the latter being in the form of an arch constructed of channel metal and having its depending ends united to the inner faces of the mold boards adjacent their rear extremities. The beam 8 and arch member 11 form parts of the frame 1, which latter also includes a pair of spaced longitudinal bars 12 having their front ends bolted to the beam 8 and their rear ends secured by bolts or a clip to the center of the arch 11.

The front wheel 3 is journaled in the forked lower end of a standard 13 which is slidably and rotatably arranged in a bearing opening in the center of the cross bar or member 10, and also in a bearing carried by a plate 14 which is supported by two upwardly and inwardly inclined braces 15 secured at their lower ends to the forward portions of the mold boards 7. The plate or support 14 which is disposed above the forward portion of the frame 1 is connected by two rearwardly diverging side bars 16 to similar plates or members 17, 18, which latter likewise carry tubular bearings in which are slidably and rotatably mounted standards 19, 20. The last mentioned standards have their lower portions rotatably and slidably mounted in bearing brackets 21 secured to the inner faces of the mold boards 7, and the lower extremities of said standards have inwardly turned portions forming spindles for the rear wheels 4, 5, as clearly shown in Fig. 2. The rear plates 17, 18, are supported by inwardly and upwardly extending braces 22 which latter rise from the mold boards 7.

Fixed to the upper extremity of the front standard 13 is a member or head 23 having a forwardly extending portion to which is secured a draft tongue 24, said head also having a laterally projecting arm 25 to which latter are pivoted the forward ends of the two rods 26, 27, having their rear ends connected to arms 28, 29, fixed to the upper extremities of the rear uprights 19, 20, respectively. Owing to these connections it will be seen that when the tongue 24 swings horizontally the three standards will be simultaneously actuated to change the direction of movement of the three wheels, thereby causing the machine to be easily turned or steered. The connecting rods 26 are preferably made longitudinally adjustable by constructing them in sections which are united by turn buckles as shown.

In order to raise or lower the front portion of the frame, and hence the cutting blades 2, vertically with respect to the supporting and steering wheel 3, a rearwardly extending hand lever 30 has its forward end pivoted to the front portion of the plate 14, the rear edge of which latter is formed with a segmental rack 31 adapted to be engaged by a spring projected pawl carried by the lever 30 and controlled by the usual pivoted hand piece 32 on said lever. The intermediate portion of the lever 30 is connected by a vertically extending link 33 to a loose collar or sleeve 34 mounted on the upper portion of the standard 13 and between two fixed collars 35. The rear portion of the frame is likewise vertically adjustable relative to the wheels 4, 5, by providing two rearwardly extending hand levers 36, 37, which are similar in construction and operation to the lever 30 just described. The vertically extending links of the levers 36, 37, have their upper ends pivotally connected to loose collars or sleeves arranged on the standards 19, 20, between fixed collars and united by a horizontal connecting strap or link 38 whereby the standards and the upper portion of the frame will be braced.

The rear or handle ends of the three levers 30, 36, 37, project within reach of the driver of the machine, who occupies a seat 39 on a spring 40 which is secured to the longitudinal bars 12.

The three wheels are preferably spiked as shown at 41 so that they will be prevented from slipping.

42 denote upwardly and outwardly curved deflecting fingers arranged in rows on the mold boards 7 and projecting above the same so as to deflect the brush and shrubbery cut by the machine and deposit the same in wind rows. From the foregoing it will be seen that my improved machine which is preferably constructed entirely of metal, is simple in construction so that it may be produced at a small cost and will be exceedingly strong and durable in use and powerful and effective in operation. When drawn forwardly by draft animals it may be easily guided, the three wheels being simultaneously turned when the draft tongue swings, and by adjusting the three levers 30, 36, 37, the cutter blades 2 may be caused to travel either on the surface of the ground or at siutable distances above or below the surface. It will be further noted that the three levers permit either side or either end of the machine to be raised higher than the opposite side or end to adapt the machine to the nature of the ground being cleared. I have found in practice that my machine will effectively clear land of sage-brush, cactus and other shrubbery found in the western part of the United States so that the land will be used for agricultural purposes after it has been cleared by the machine.

Having thus described the invention, what is claimed is:

1. In a machine of the character described, the combination of a pair of horizontally disposed cutter blades, upright mold boards rising from said blades and arranged in forwardly converging relation, three ground wheels arranged in triangular relation between the cutter blades and mold boards and provided with means to prevent them from slipping, a frame supported by said wheels and including longitudinal bars, a rear arch united to the latter and to the diverging rear ends of the mold boards, a draft beam united to the front ends of said longitudinal bars and the converging front ends of the mold boards, a front and two rear rack members provided with tubular bearings, side bars connecting the front and rear members, braces uniting said members to the mold boards, front and rear standards slidably and rotatably mounted in said bearings and carrying the spindles for said ground wheels, levers fulcrumed on said members and carrying pawls to co-act with the racks on said members, collars rotatably but non-slidably mounted on said standards, connections between said levers and said collars, a tongue, and means actuated by the latter for simultaneously turning the three standards.

2. In a machine of the character described, the combination of forwardly converging cutters, a draft beam united to the forward ends of the cutters, a rear arch united to the diverging rear portion of the cutters, a longitudinal bar uniting said arch and beam, front and rear rack members provided with tubular bearings, side bars uniting said front and rear members, braces between said members and the cutters, front and rear standards vertically slidable in said tubular bearings, ground wheels carried by said standards and provided with means to prevent them from slipping, collars rotatably but non-slidably arranged on said standards, levers fulcrumed on said members and carrying pawls to co-act with the racks on said members, and connections between said levers and said collars.

3. In a machine of the character described, the combination of forwardly converging, horizontally arranged, cutter blades having notched and beveled outer edges, forwardly converging mold boards rising from said blades, upwardly and outwardly extending deflector fingers arranged in longitudinal rows above the mold boards, a front and two rear ground wheels arranged in triangular relation between the cutter blades and provided with means to prevent them from slipping, a frame supported by the ground wheels and carrying said cutter blades and mold boards, means for adjusting the frame vertically with respect to the ground wheels, a draft tongue, and means actuated by the tongue for simultaneously turning the three wheels.

ROBERT G. GOSE.

Witnesses:
J. L. STOTTS,
W. L. N. HETTLEHORST.